United States Patent [19]

Ruck et al.

[11] Patent Number: 5,772,709
[45] Date of Patent: Jun. 30, 1998

[54] APPARATUS FOR REMOVING AMMONIA AND CARBON DIOXIDE GASES FROM A STEAM

[75] Inventors: Donald Neal Ruck, Holley; James Richard Lines, Lancaster; Roderick Elwyn Athey, Pittsford; David William Tice, Holley, all of N.Y.

[73] Assignee: Graham Corporatiom, Batavia, N.Y.

[21] Appl. No.: 634,241

[22] Filed: Apr. 18, 1996

[51] Int. Cl.⁶ ................................................ B01D 47/14
[52] U.S. Cl. .................. 55/222; 55/240; 95/217; 95/229; 95/232; 95/236; 261/97; 261/155
[58] Field of Search ............ 261/97, 118, 112.1, 261/155, 116; 55/222, 240, 260, 268, 269; 95/211, 217, 228, 229, 232, 236, 288

[56] References Cited

U.S. PATENT DOCUMENTS

| | | | |
|---|---|---|---|
| 1,564,051 | 12/1925 | Ehrhart | 261/118 |
| 3,131,237 | 4/1964 | Collins, Jr. | 55/222 X |
| 3,526,082 | 9/1970 | Thuillier | 261/112.1 X |
| 3,755,990 | 9/1973 | Hardison | 55/222 X |
| 3,916,021 | 10/1975 | Hajek et al. | 261/97 |
| 3,969,081 | 7/1976 | Jackson | 261/112.1 X |
| 4,288,393 | 9/1981 | Sekiguchi et al. | 261/118 X |

Primary Examiner—Richard L. Chiesa
Attorney, Agent, or Firm—Cumpston & Shaw

[57] ABSTRACT

A geothermal steam condenser for reducing residual ammonia gas from a geothermal steam. The present condenser includes a column attached to the condenser for forming a curtain of temperature conditioned condensate, such that residual ammonia gas is passed through the conditioned water curtain to be furthered absorbed prior to exiting the geothermal steam condenser.

11 Claims, 6 Drawing Sheets

APPARATUS FOR REMOVING AMMONIA AND CARBON DIOXIDE GASES FROM A STEAM

FIELD OF THE INVENTION

The present invention relates to removing ammonia and carbon dioxide from a geothermal steam, and more particularly to a two stage system having a first stage condenser for creating a substantially predetermined residual gas composition and condensate in the condenser and a second stage column for absorbing ammonia and carbon dioxide gases into the condensate from the residual gas composition.

BACKGROUND OF THE INVENTION

Condensers are often connected to a low pressure exhaust of a steam turbine (1) to produce a vacuum or desired back pressure for improvement of the power cycle efficiency; and in some circumstances (2) to condense the turbine exhaust steam for possible reuse; and (3) to deaerate the condensate.

Traditional power generation facilities have employed coal, gas, natural gas, oil or other burnable materials as a source of power. In these systems, a quantity of water is turned to steam and passed through a turbine, condensed and reexposed to the heat source.

As the awareness of energy sources and their impact on the environment has increased, the demand for alternate power sources has risen. While geothermal steam can offer significant advantages for power generation, the steam may contain contaminants such as potentially harmful gases which are undesirable in the atmosphere. In fact, the introduction of some contaminants often found in geothermal steam are restricted by government regulation. Additionally, the removal of gases from the geothermal steam is beneficial to a reduction in the utility requirements for operating the power system.

Therefore, the need exists for a condenser for use with geothermal steam which provides for reduced emission of selected contaminants, thereby creating a residual gas mixture of substantially predetermined composition. The need also exists for a method of selecting such condensers to adequately remove the selected contaminants and produce a controllable condensate. A further need exists for subsequently treating the residual gas to absorb ammonia and carbon dioxide from the residual gas into the condensate.

SUMMARY OF THE INVENTION

The present invention includes a two stage steam condenser assembly for removing ammonia and carbon dioxide from a geothermal steam. In the first stage, a residual gas of a substantially predetermined composition and condensate are formed in a selected condenser. In the second stage the residual gas is treated to reduce ammonia and carbon dioxide gases by absorption into the condensate. As used herein, the term "residual" includes those gases that remain in a gaseous state after exposure of the geothermal steam to the condensing surfaces in the condenser. That is, the residual gases are unabsorbed into the condensate in the condenser.

The present gas removal process includes absorption of the ammonia and carbon dioxide gases into a condensate; and a subsequent reaction of the absorbed gases to form aqueous ammonium carbonate, thus reducing the amount of both ammonia and carbon dioxide to be vented from the condenser assembly.

The first stage of the condenser assembly includes a condenser having a vapor inlet, a condensing surface, a flow control surface, a subcooling section to allow a condensate to be cooled to a temperature below a saturation temperature in the condenser; and the second stage includes a column connected to the condenser, the column including a vapor outlet and a condensate outlet, and a flow forming surface for configuring a flow of the condensate from the condenser to form a condensate curtain in the column, the curtain being disposed intermediate the vapor inlet and the vapor outlet.

The present method for reducing ammonia and carbon dioxide gases in geothermal steam following condensation in the condenser includes forming a curtain of temperature conditioned condensate and passing the residual ammonia gas through the conditioned water curtain to absorb at least a portion of the residual ammonia and carbon dioxide gases before exiting the condenser assembly.

The method for selecting a first stage geothermal steam condenser to produce a condensate and residual gas composition of substantially predetermined amounts of ammonia and carbon dioxide gases includes specifying an inlet amount of water vapor, ammonia, carbon dioxide and a noncondensable gas; estimating an amount of the ammonia and carbon dioxide unabsorbed by a condensate of the water vapor produced by condensation with a condenser tube in the steam condenser; determining a corresponding partial pressure of the ammonia and carbon dioxide gas; calculating the partial pressure of the noncondensable gas based upon the partial pressures of the water vapor, ammonia, carbon dioxide and a total specified pressure in the geothermal steam condenser; calculating the amount of noncondensable gas and comparing the calculated amount to the specified amount; and reiterating the previous steps until the calculated amount of the noncondensable gas equals the specified amount. Once the final composition of the gases exiting the condenser have been determined, the condenser sizing is selected with corresponding flow control surfaces and cooling tubes to achieve the predetermined conditions. The residual gas mixture thus formed by the first stage condenser is then treated in a column by passing the residual gas through a condensate curtain to absorb additional ammonia and carbon dioxide gases in the condensate.

DETAILED DESCRIPTION OF THE PREFERRED EMBODIMENTS

Figure 1:
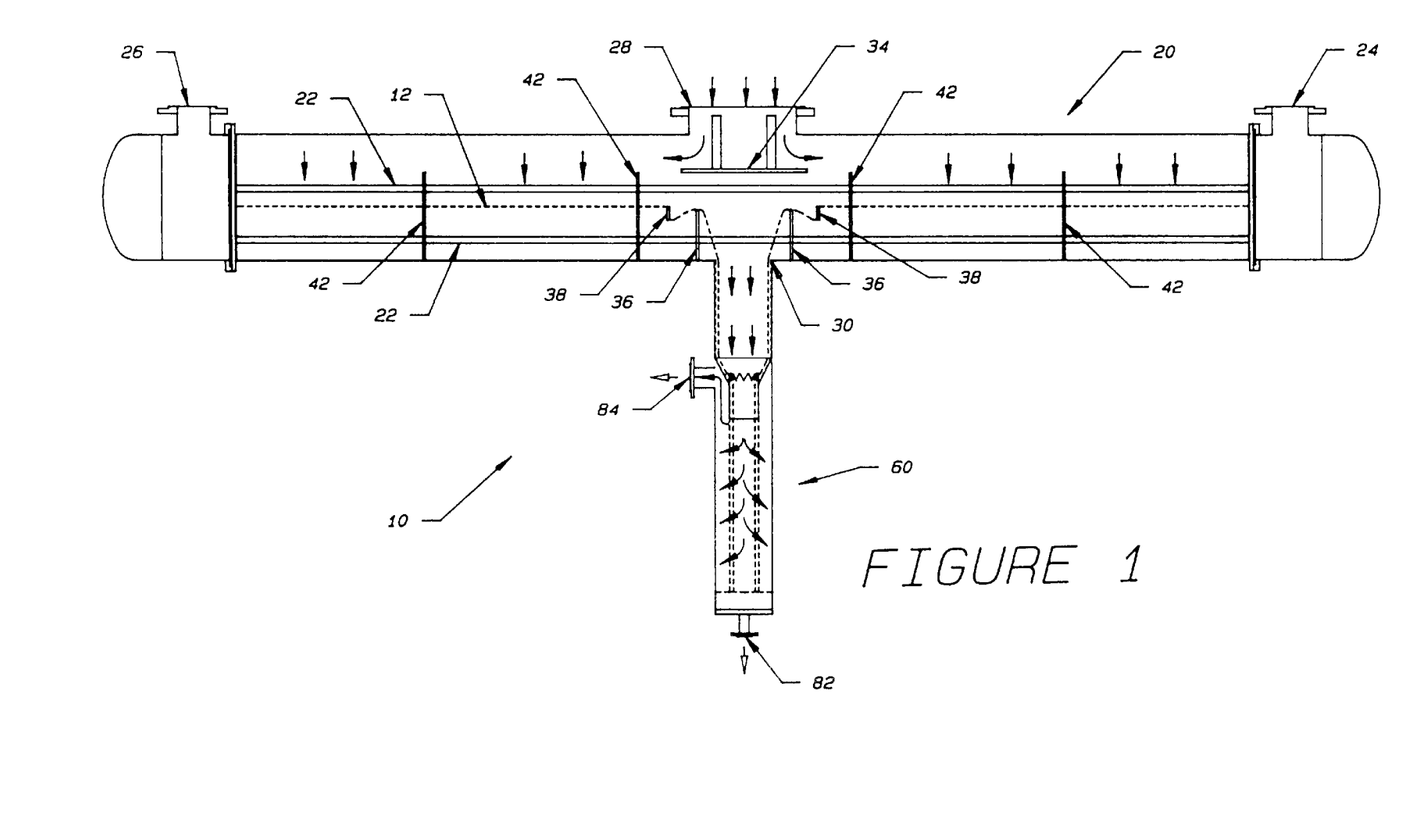
FIG. 1 is a partial cross sectional side elevational view of the geothermal steam condenser.

Referring to FIG. 1, the two stage geothermal steam condenser assembly 10 of the present invention includes a first stage condenser housing 20 and a second stage forming column 60.

The condenser housing 20 of the first stage is sized to retain a plurality of cooling tubes 22. The cooling tubes 22 are fluidly connected to a cooling water inlet 24 and a cooling water outlet 26. Tube support sheets 42 are disposed in the condenser housing to retain the cooling tubes 22 and to direct the flow of vapor (steam) within the condenser housing 20. Baffles 34 may also be used to direct the steam flow in the condenser housing 20.

The condenser housing 20 includes a vapor inlet 28 and an outlet 30. The vapor inlet 28 is connected to a steam source such as a turbine exhaust. The outlet 30 is sized to pass condensate and uncondensed and unabsorbed gases from the condenser housing 20. In the present embodiment, the outlet 30 has a circular periphery.

The condenser housing 20 also includes flow control surfaces 36 and 38. Referring to FIGS. 1–4, the flow control surface 36 is a weir for setting an amount of condensate thermally coupled to the cooling tubes 22. That is, the weir 36 determines the quantity of cooling tubes 22 immersed in the condensate. The flow control surface 38 is a weir or mixing barrier for directing a surface flow of condensate to descend into the condensate and further mix.

As shown in FIGS. 1–4, in the present embodiment, the cooling tubes 22 are linearly arranged parallel to a longitudinal axis of the condenser housing 20. In this embodiment, the weirs 36, 38 also function as cooling tube supports and extend perpendicular to the length of the tubes 22 and condenser housing 20. That is, the cooling tubes 22 pass perpendicularly through the weirs 36, 38. For clarity, only two cooling tubes 22 are shown in the condenser housing 20 and extend between the respective weirs 36, 38. It is understood, the number and location of the cooling tubes 22 is greater than the two shown.

Figure 2:
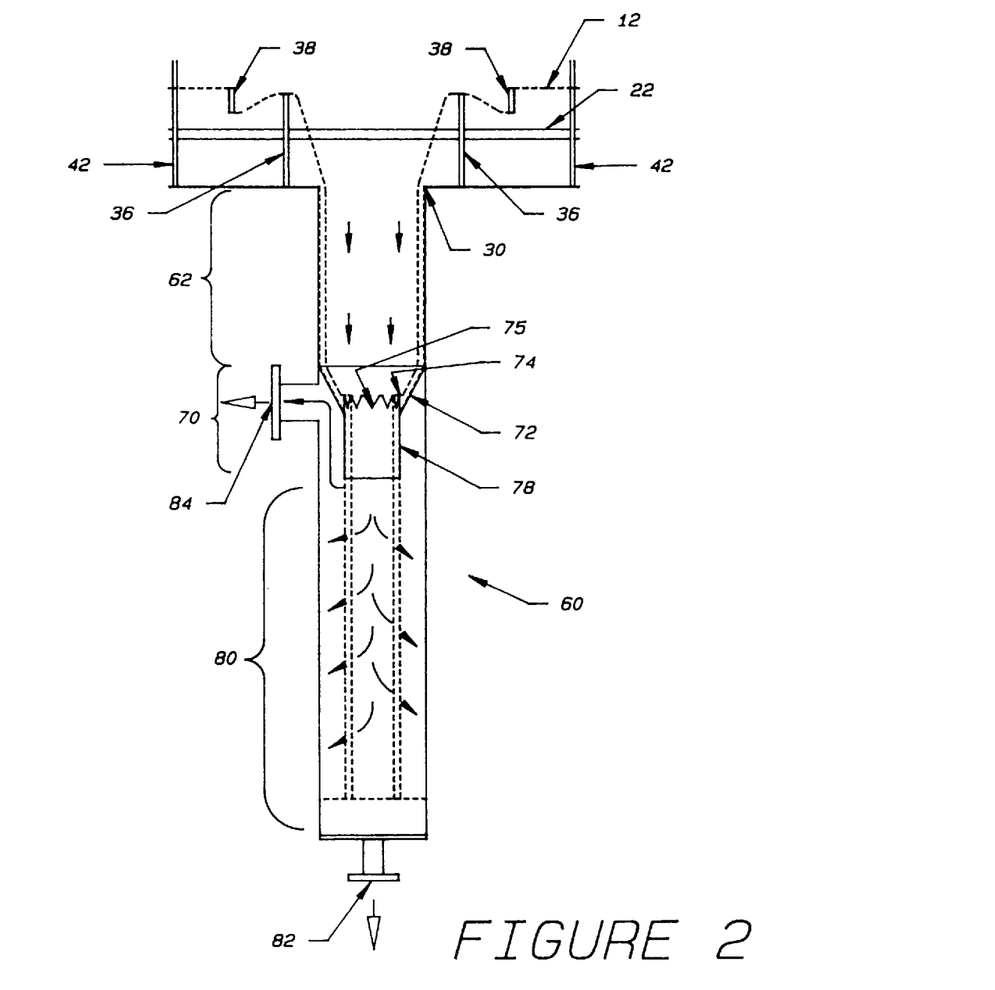
FIG. 2 is a side elevational cross sectional view of the column and flow control surfaces of the geothermal steam condenser.

Referring to FIG. 2, the column 60 of the second stage is connected to the outlet 30 of the first stage condenser housing 20 to permit the condensate to flow from the housing into the column. The column 60 includes a spillway 62; a forming chute 70; a curtain portion 80; a condensate outlet 82 and a vapor outlet 84.

Figure 3:
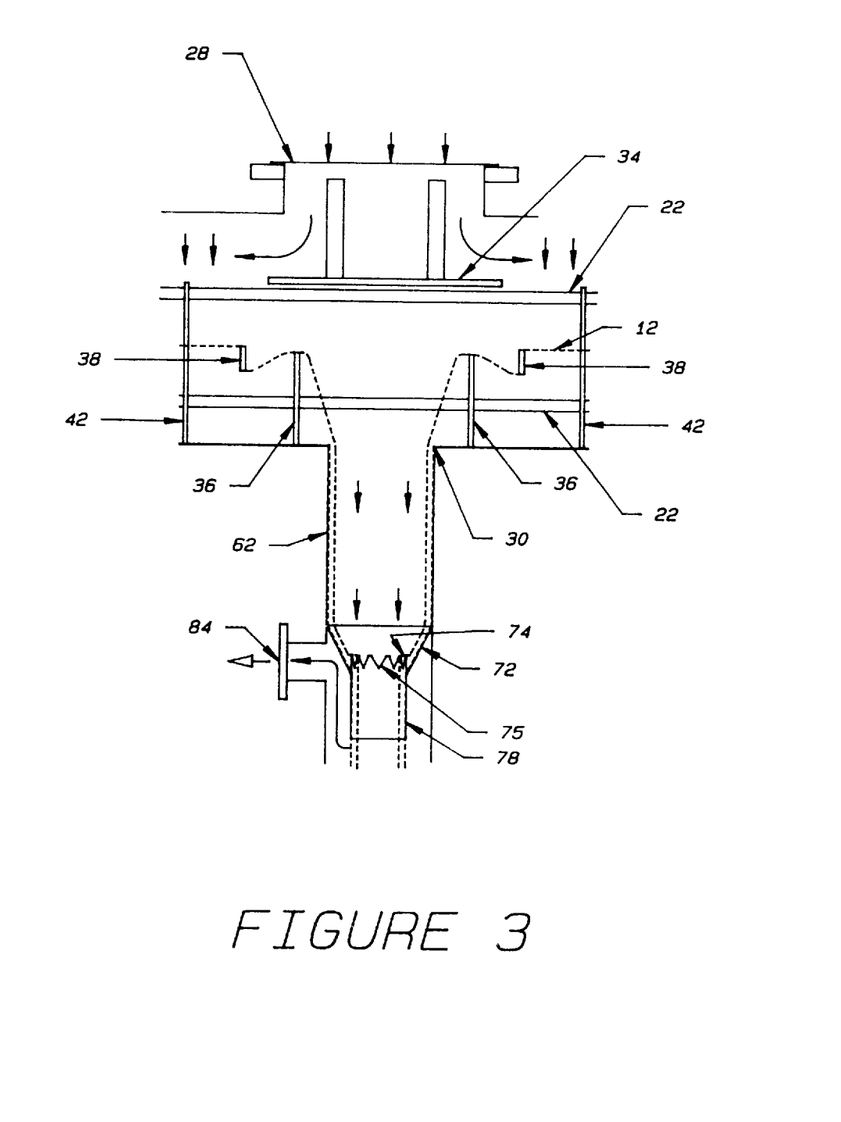
FIG. 3 is an enlarged cross sectional side elevational view of the vapor inlet to the condenser and the upper portion of the column.
Figure 4:
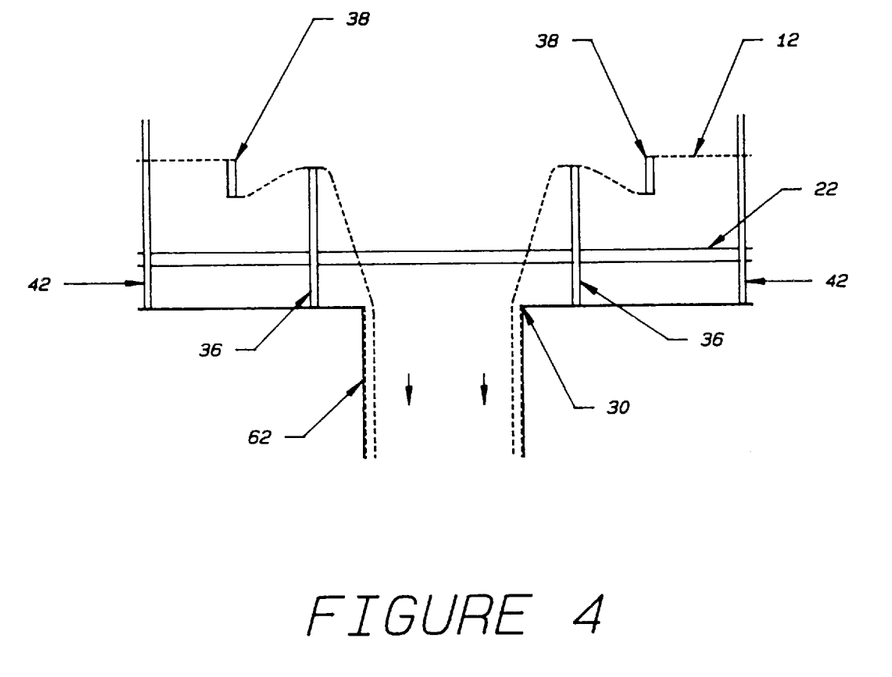
FIG. 4 is an enlarged cross sectional side elevational view of the flow control surfaces in the condenser body.
Figure 5:
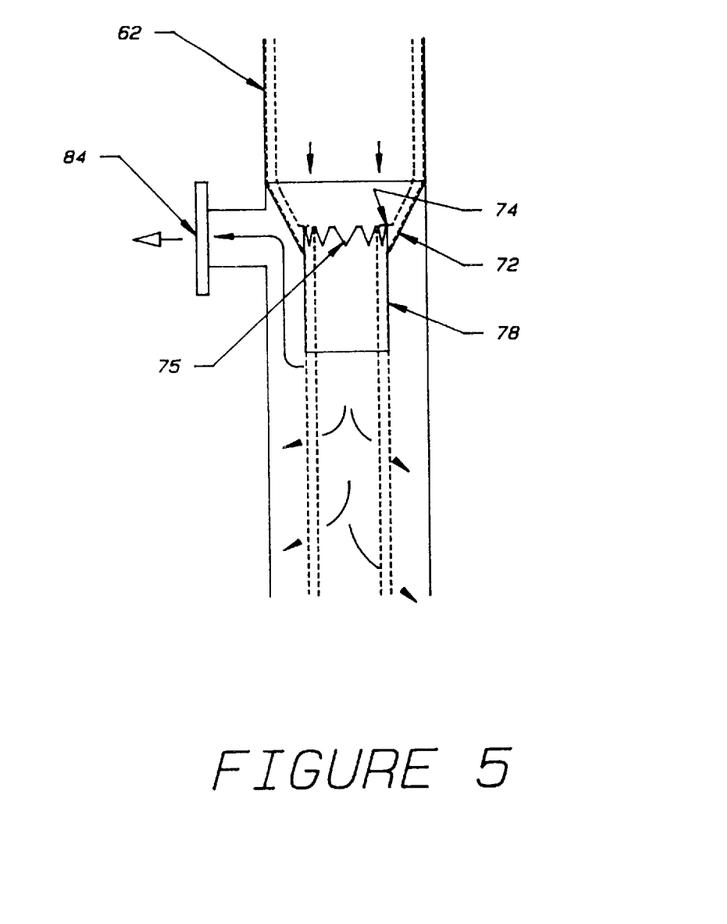
FIG. 5 is an enlarged cross sectional side elevational view of the curtain forming surfaces in the column.

Preferably, the column 60 is a cylindrical member with a substantially circular cross section. The spillway 62 extends from the junction with the condenser housing 20 to the forming chute 70 and represents approximately one-third the height of the column. As shown in FIGS. 2 and 3, the forming chute 70 includes three surfaces: a restricting surface 72, a curtain forming surface 74 and a guiding surface 78. The restricting surface 72 is a frustoconical or funnel shaped member, tapering from a larger diameter adjacent the spillway 62 to a narrower diameter at the curtain forming surface 74. The curtain forming surface 74 is generally saw-toothed to define a plurality of discontinuities 75. Although the curtain forming surface 74 is generally sawtoothed, the surface may be a substantially planar surface. The curtain forming surface 74 extends above a lower edge of the restricting surface 72 to form a generally annular cavity therebetween.

The guiding surface 78 is a cylindrical surface extending below the curtain forming surface 74. The forming chute 70 thus tapers the condensate flow from the diameter of the column to a reduced diameter.

In one example of the present embodiment, the column 60 has a 16 inch diameter, and an overall length of approximately 100 inches, where the spillway 62 has a length of 27 inches, the forming chute 74 has a length of 17.5 inches and the curtain portion 78 has a length of 55.5 inches.

The condensate outlet 82 is located in the bottom of the column 60 for allowing passage of condensate from the column. The vapor outlet 84 extends from the side of the column 60 adjacent the curtain forming surface 74. The vapor outlet 84 is connected to a vacuum source for drawing uncondensed and unabsorbed water vapor and gases and through the vapor outlet.

Figure 6:
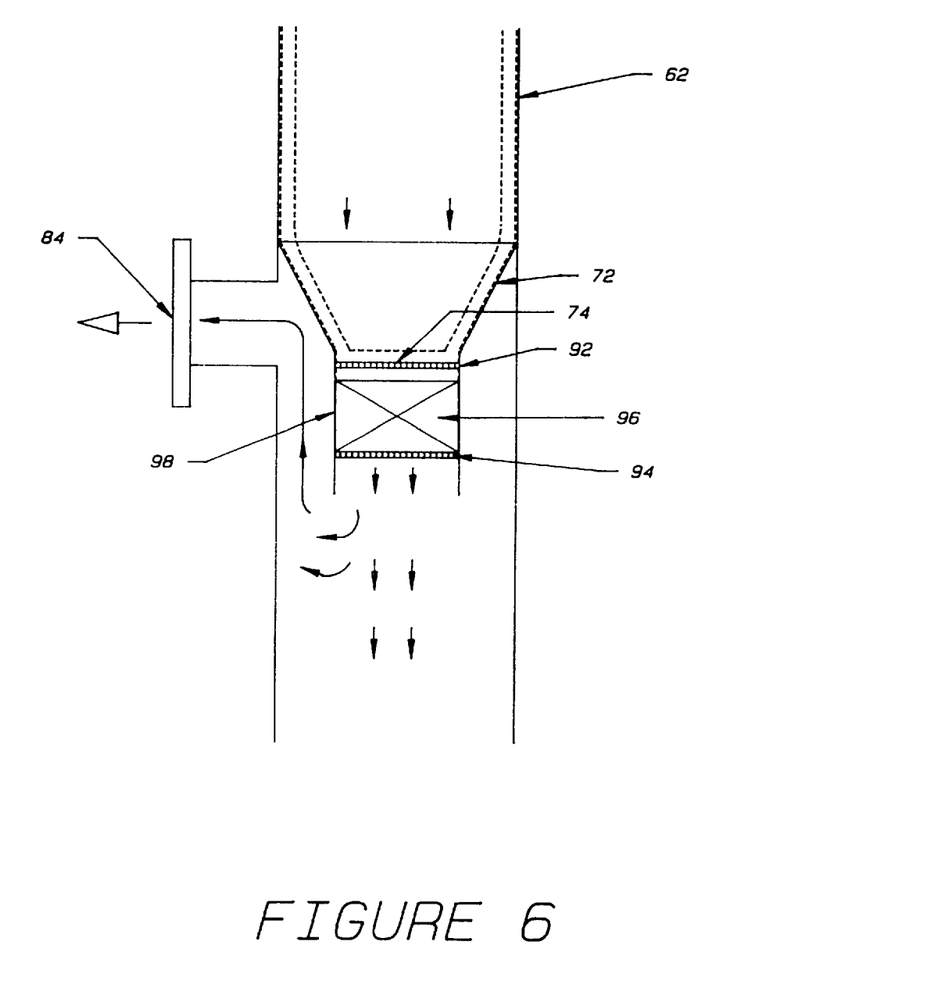
FIG. 6 is an enlarged cross sectional view of packing in the column.

As shown in FIG. 6, the column may include a packing 96 such as high surface area to volume media, or trays. The packing 96 is selected to increase the residence time and contact area between the condensate and the gases passing from the condenser housing. Preferably, the packing 96 is located in the spillway 62 or within the descending curtain in the curtain portion. Specifically, the forming chute 70 includes a liquid distribution plate 92 above the packing 96, and a support plate 94 beneath the packing. The liquid distribution plate 92 is a perforated plate with apertures that permit passage of liquid therethrough.

OPERATION

In operation, cooling water is introduced to the cooling water inlet 24 and passes through the cooling tubes 22 to exit through the cooling water outlet 26. Geothermal steam enters the condenser housing 20 of the first stage through the vapor inlet 28 and is directed by the baffle 34 to contact the outside surface of cooling tubes 22. A condensate 12 is formed and the surface of the condensate 12 is shown as a dashed line in FIGS. 1 and 2. The condensate accumulates until overcoming the weir 36 to descend through the outlet 30 and into the spillway 62 of the second stage column 60.

The descending condensate contacts the restricting surface 72 and begins to form a cylindrical body. The condensate then passes over the curtain forming surface 74 to form a substantially continuous flow. The continuous flow contacts the guiding surface 78 and follows the surface to its terminal end. A continuous curtain of condensate is thus formed and descends into the curtain portion 80. The condensate curtain descends through the curtain portion 80 of the column 60 to accumulate adjacent the condensate outlet 82.

As the geothermal steam is condensed in the main condenser 20, a substantially predetermined portion of the ammonia and carbon dioxide is not absorbed. The residual gases passing from the condenser housing 20 may include an unacceptable or undesired level of uncondensed and/or unabsorbed gases such as ammonia and carbon dioxide. The residual gases are treated in the second stage column 60 to remove additional amounts of ammonia and carbon dioxide gases. As a vacuum is placed on the vapor outlet 84 in the column 60, the residual gases, including ammonia and carbon dioxide, are drawn from the first stage housing 20 through the outlet 30 and into the spillway 62. As a curtain of condensate is descending from the forming chute 70, the exiting vapor becomes "trapped" within the descending condensate curtain. The relatively low pressure of the vapor outlet 84 creates a pressure differential across the descending curtain and the residual gas mixture including ammonia and carbon dioxide are forced to pass through the descending curtain. As these gases pass through the curtain, the ammonia and carbon dioxide gases experience an increased residence time with the condensate 12, thereby causing a portion of the residual ammonia and carbon dioxide to be further absorbed in the condensate.

Turning to the embodiment of FIG. 6, the condensate 12 descends from the spillway 62 and collects on the liquid distribution plate 92 to form a horizontal curtain of condensate. The residual ammonia and carbon dioxide gases are drawn through the curtain on the liquid distribution plate 92. Upon entering the packing they experience further residence time and increased contact area with the condensate in the packing 96 to further absorb ammonia and carbon dioxide gases in the condensate.

By selectively controlling the parameters of the first stage condenser 20 such as the number and disposition of cooling tubes 22, and the condensate subcooling temperature, the amount of residual (uncondensed and/or unabsorbed gases), such as ammonia and carbon dioxide vapor exiting the first stage condenser 20 are controlled to predetermined levels. The temperature of the condensate 12 (and hence the condensate curtain) can be adjusted by controlling the exposure of the condensate 12 to the cooling tubes 22, that is, the condensate 12 may be subcooled below the condensing temperature. The amount of subcooling in turn is controlled by the temperature of the cooling water, and the depth of the condensate about the cooling tubes 22. The depth of the condensate 12 contacting the cooling tubes 22 is set by the weir 36.

SELECTING THE FIRST STAGE GEOTHERMAL STEAM CONDENSER

To select the first stage geothermal steam condenser 10, for the effective creation of a predetermined residual gas composition including ammonia and carbon dioxide, a multi step process is employed. Specifically:

1. Inlet amounts of water vapor (steam), ammonia, carbon dioxide, and air (or other noncondensable gas) is known along with the operating pressure and temperature of the condenser. These inlet amounts may be determined by measuring the actual geothermal steam components at the site, or be based upon given values. The operating temperature and pressure is in part determined by the geothermal steam parameters, the cooling water parameters and the condenser parameters.

2. An amount of ammonia and carbon dioxide not being absorbed by the condensate is estimated. Based upon equilibrium charts, such as those by W. VanKrevelen et al., the partial pressures corresponding to the estimated amounts of unabsorbed ammonia and carbon dioxide are determined in view of the operating temperature and pressure of the condenser.

3. The partial pressure of the remaining water vapor is taken from standard steam tables at the operating temperature of the condenser.

4. As the partial pressure of the water vapor is known, and the partial pressure of the ammonia and carbon dioxide is known (based upon the estimated amount unabsorbed in the condensate) and the operating pressure of the condenser has been identified, the partial pressure of the noncondensable gas is calculated.

5. Employing the general relationship between the partial pressure of each component and the moles of that gas ($P_i/M_i$), the accuracy of the initial estimate of the ammonia and carbon dioxide gas not being absorbed in the condensate is determined.

6. An iterative process is used to calculate the final composition of the gas mixture and these steps are reiterated until the calculated amount of the noncondensable gas equals the specified amount as set forth in step 1.

7. Once the calculated amount and the specified amount of noncondensable gas are equal, or within an acceptable degree of equivalence, a condenser is selected with corresponding flow control surfaces and cooling tubes to achieve the degree of absorption calculated and hence a residual gas mixture of substantially predetermined composition.

Therefore, the present invention allows the selecting of a first stage geothermal steam condenser to produce a flow rate of a condensate having a substantially predetermined composition along with a residual gas mixture of predetermined composition from a geothermal steam including (a) specifying an inlet amount of water vapor, a first gas and a second noncondensable gas; (b) estimating an amount of the first gas unabsorbed by a condensate of the water vapor; (c) determining a corresponding partial pressure of the first gas; (d) calculating the partial pressure of the second noncondensable gas based upon the partial pressures of the water vapor, the first gas and the total specified pressure in the geothermal steam condenser; (e) calculating the amount of the second noncondensable gas and comparing the calculated amount to the specified amount; and (f) reiterating steps b–e until the calculated amount of the second noncondensable gas substantially equals the specified amount or is within an acceptable degree of equivalence. A first stage condenser is then selected having sufficient thermal transfer capabilities to achieve the calculated absorption and create a residual gas with the calculated composition. Specifically, the condenser is selected with flow control surfaces and cooling tubes to attain the required heat transfer. The formed residual gas mixture and condensate are then interfaced in the second stage column in order to further reduce the ammonia and carbon dioxide gases exiting the condenser assembly.

It is understood that the present invention may be employed with any combination of the features disclosed, or their equivalents. While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A two stage condenser assembly for absorbing ammonia and carbon dioxide gases in a condensate of water from a steam, comprising:
   (a) a first stage condenser housing having a vapor inlet, an outlet and a condensing surface, the condenser housing including a subcooling section to allow a condensate to be cooled to a temperature below a saturation temperature in the condenser housing;
   (b) a second stage column connected to the first stage condenser housing, the column including a vapor outlet and a condensate outlet; and
   (c) a flow control surface for regulating a flow of the condensate from the first stage condenser housing to the second stage column to form a condensate curtain in the column, the condensate curtain intermediate the vapor inlet and the vapor outlet, the flow control surface, the vapor inlet and the vapor outlet selected to locate the condensate curtain to occlude passage of a residual gas from the first stage condenser housing to the vapor outlet.

2. The condenser of claim 1 further comprising a packing in the column.

3. The condenser of claim 2 wherein the packing is positioned intermediate the vapor inlet and the condensate curtain.

4. The condenser of claim 2, wherein the packing includes an increased surface contact area to enhance absorption of the residual gas.

5. The condenser of claim 2, wherein the packing is one of a tray and mesh.

6. The condenser of claim 1, wherein the flow control surface is disposed in the condenser housing.

7. The condenser of claim 1, wherein the flow control surface is disposed in the column.

8. A two stage condenser assembly for absorbing gases into a condensate of a steam containing water vapor and the gases, comprising:
- (a) a first stage condenser housing having a vapor inlet, an outlet and a condensing surface to form a condensate and a residual gas containing the gases;
- (b) a second stage connected to the first stage condenser housing, the second stage including a vapor outlet and a condensate outlet; and
- (c) a flow control surface for regulating a flow of the condensate from the first stage condenser housing to the second stage to form a continuous condensate barrier in the second stage, the barrier intermediate the vapor inlet and the vapor outlet, the flow control surface, the vapor inlet and the vapor outlet selected to pass the residual gas through the continuous condensate barrier as the residual gas travels from the first stage condenser housing to the vapor outlet.

9. The two stage condenser assembly of claim 8, wherein the flow control surface includes a weir for substantially setting the amount of condensate passing from the first stage condenser housing to the second stage.

10. The two stage condenser assembly of claim 8, wherein the flow control surface is selected to form a condensate barrier having a continuous periphery.

11. The two stage condenser assembly of claim 10, wherein the flow control surface creates the condensate barrier to surround the residual gas passing from the first stage condenser housing.

* * * * *